United States Patent
Patel et al.

(10) Patent No.: US 10,055,421 B1
(45) Date of Patent: Aug. 21, 2018

(54) PRE-EXECUTION QUERY OPTIMIZATION

(71) Applicant: XACTLY CORPORATION, San Jose, CA (US)

(72) Inventors: Nirav Patel, Santa Clara, CA (US); Gowri Shankar Ravindran, Cupertino, CA (US)

(73) Assignee: XACTLY CORPORATION, San Jose, CA (US)

( * ) Notice: Subject to any disclaimer, the term of this patent is extended or adjusted under 35 U.S.C. 154(b) by 0 days.

(21) Appl. No.: 15/488,315

(22) Filed: Apr. 14, 2017

(51) Int. Cl.
*G06F 7/00* (2006.01)
*G06F 17/30* (2006.01)

(52) U.S. Cl.
CPC .. *G06F 17/30153* (2013.01); *G06F 17/30312* (2013.01); *G06F 17/30442* (2013.01); *G06F 17/30445* (2013.01); *G06F 17/30463* (2013.01); *G06F 17/30469* (2013.01)

(58) Field of Classification Search
None
See application file for complete search history.

(56) References Cited

U.S. PATENT DOCUMENTS

| | | | | |
|---|---|---|---|---|
| 8,817,309 B2 * | 8/2014 | Tsuda | | G06F 3/122 358/1.1 |
| 9,501,585 B1 * | 11/2016 | Gautam | | G06F 17/30572 |
| 9,703,833 B2 * | 7/2017 | Buchmann | | G06F 17/30466 |
| 9,722,851 B1 * | 8/2017 | Hill | | H04L 29/08072 |
| 2008/0033925 A1 * | 2/2008 | Richards | | G06F 17/30545 |
| 2013/0018694 A1 * | 1/2013 | Dubbels | | G06Q 10/00 705/7.27 |
| 2014/0351233 A1 * | 11/2014 | Crupi | | G06F 17/30516 707/706 |
| 2015/0347542 A1 * | 12/2015 | Sullivan | | G06F 17/30563 707/602 |
| 2017/0126808 A1 * | 5/2017 | Baptist | | H04L 67/1097 |

* cited by examiner

*Primary Examiner* — Uyen Le
(74) *Attorney, Agent, or Firm* — Hickman Palermo Becker Bingham LLP

(57) ABSTRACT

A data processing method comprises using an application server computer of an application service provider (ASP), establishing computerized shared multi-tenant data storage in which tenant data that is associated with a plurality of different tenants of the ASP is stored together in a first database associated with a distributed computation system that is separate from the application server computer, receiving an analytics request, determining, based on at least one attribute of the analytics request, the application server computer will process at least the analytics request, sending, to the distributed computation system, a first query for data needed by the analytics request, receiving, from the distributed computation system, an interim result set of data resulting from processing the first query against the first database, processing, by the application server computer, the interim result set of data for the analytics request to generate and digitally store a first result set.

16 Claims, 4 Drawing Sheets

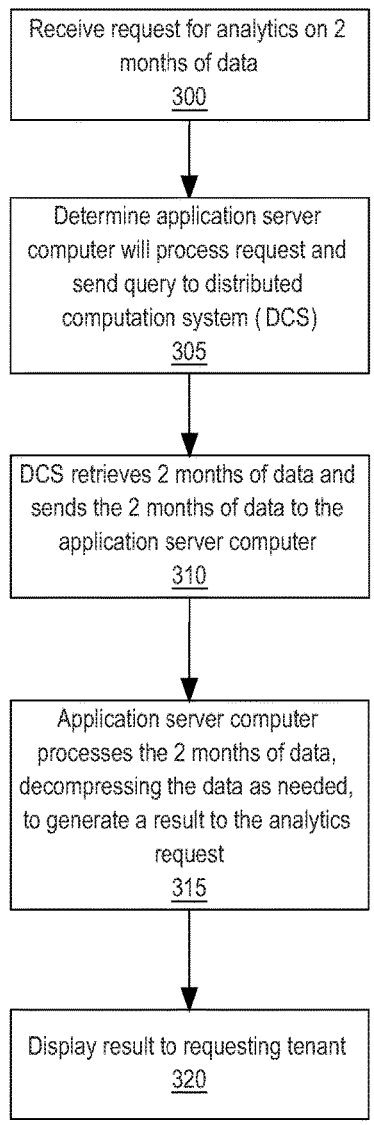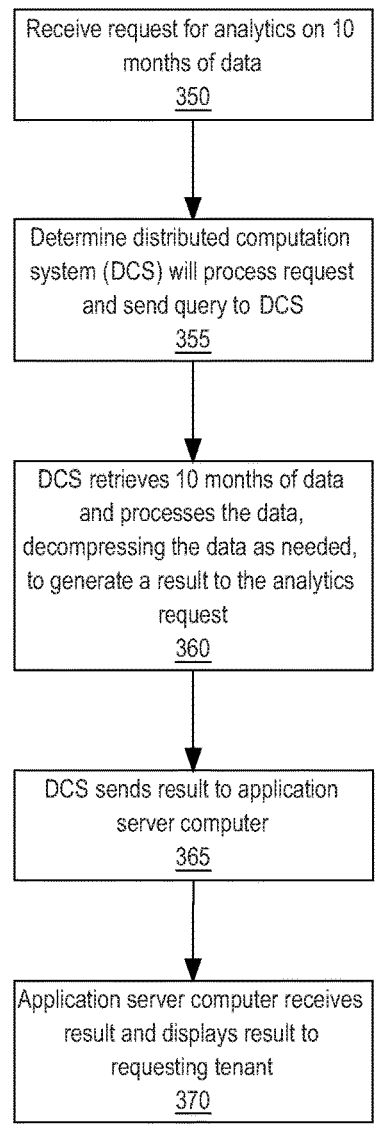
Fig. 3A
Fig. 3B

PRE-EXECUTION QUERY OPTIMIZATION

FIELD OF THE DISCLOSURE

The technical fields of the present disclosure are digital computer databases, and programming techniques for digital computers relating to optimization or transformation of queries to databases before the queries are executed. Embodiments generally relate to improved methods, computer software, and/or computer hardware in the field of data analysis including computer-implemented techniques for improving the speed and efficiency with which analytics may be performed.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Increases in hardware and software support costs have given way to a new technology delivery model in which an application service provider hosts applications coupled to data storage units on networked devices that are owned by the application service provider. The application service provider's customer computers, typically with business enterprises, connect to the hosted applications via a web browser and enter data via the applications with the expectation that the data entered will be available on-demand whenever needed. The customer computers typically access the data for various data mining or data aggregation operations required to perform various analytics, such as determining particular trends related to enterprise operations. "Analytics," in this context, refers to calculations that are performed on large datasets and/or using complex algorithms that seek to find trends, correlations or other meaning in the datasets.

These analytics may take a long time to perform even with high-speed computers and contemporary database architectures. When processing analytics takes a long time, the computers and databases involved in the analytics may be available for fewer other operations or available later in time. Long computation times also typically indicate the use of large amounts of buffer memory and/or scratchpad data storage to store interim results or metadata that are necessary during computation. Therefore, long processing times ultimately result in inefficient data processing and consumption of excess processor, memory and storage resources. Any improvements in reducing the time needed to perform analytics may result in reduced consumption of these machine resources and more efficient data processing, and therefore improved methods of performing analytics are needed.

BRIEF DESCRIPTION OF THE DRAWINGS

In the drawings:

FIG. 3A illustrates an example of improving the speed of data analytics.

FIG. 3B illustrates a second example of improving the speed of data analytics.

DETAILED DESCRIPTION

Figure 1:
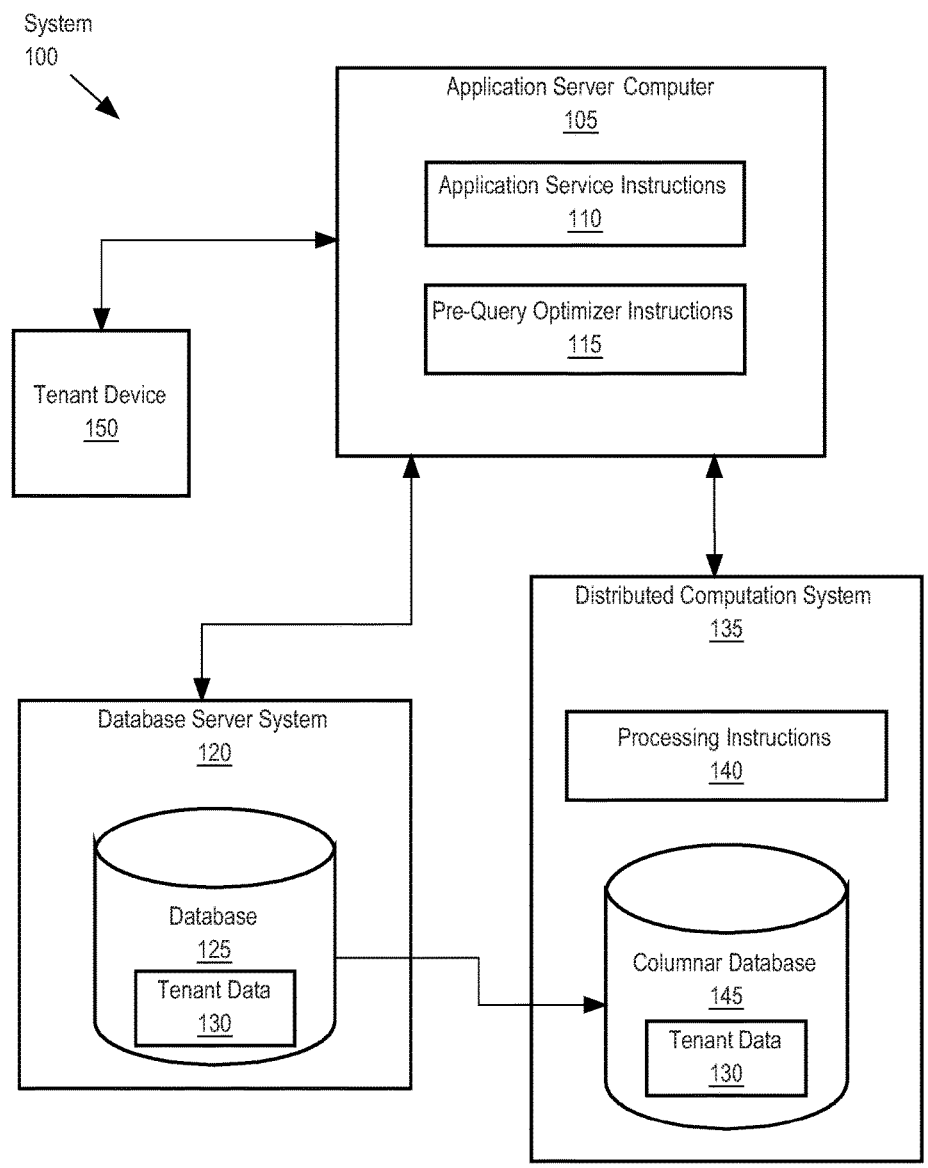
FIG. 1 illustrates an example computer system in which the techniques described herein may be practiced, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:

1. GENERAL OVERVIEW
2. OVERVIEW OF RELATED TECHNOLOGY AND TERMINOLOGY
3. EXAMPLE SYSTEM IMPLEMENTATION
4. EXAMPLE FUNCTIONAL IMPLEMENTATION
5. EXAMPLE IMPROVING SPEED OF DATA ANALYTICS
6. IMPLEMENTATION EXAMPLE—HARDWARE OVERVIEW
7. EXTENSIONS AND ALTERNATIVES

1. General Overview

In an embodiment, computer-implemented techniques are provided for improving the speed of data analytics and thereby reducing the consumption of machine resources such as CPU, volatile or non-volatile memory and/or persistent data storage. Embodiments can be implemented in special-purpose computing devices, or programmed general-purpose computers.

Generally, based on attributes of an analytics request, using logic or under program control a determination is made whether the processing or calculations associated with the analytics request will be performed by an application server computer or by a distributed computation system. The distributed computation system is a distributed computation framework and may comprise one or more data sources storing data needed by an analytics request, in any format, and is capable of processing data to arrive at a result(s) to an analytics request. Further, the data sources may be NOSQL databases, distributed file systems, or any other type or format for storing analytical data. Depending on the request, processing the analytics request by the application server computer, instead of by the distributed computation system, can result in a significant time savings and reduced use of CPU, memory and/or other data storage. Determining whether the processing or calculations associated with the analytics request "will be performed" by the application server computer or a distributed computation system in this context may mean "is best performed" or "most efficiently performed" or "can be performed in the least time".

In an embodiment, an application server computer of an application service provider (ASP), establishes computerized shared multi-tenant data storage in which tenant data that is associated with a plurality of different tenants of the ASP is stored together in a distributed computation system comprising a first database separate from the application server computer. The application server computer is programmed or configured to perform receiving, from a tenant computer that is associated with a tenant of the plurality of different tenants, an analytics request, determining, based on at least one attribute of the analytics request, whether the application server computer will process at least a portion of the analytics request, in response to determining the application server computer will process at least the portion: sending, to the distributed computation system, a first query for data needed by the analytics request, receiving, from the distributed computation system, an interim result set of data resulting from processing the first query against the first database, processing, by the application server computer, the interim result set of data for the analytics request to generate and digitally store a first result set.

All values used in performing these computer-implemented techniques, including source data, requests, queries, result sets, may comprise data values that are digitally stored in electronic digital computer memory that is accessed, manipulated and updated using digital processors.

2. Overview of Related Technology and Terminology

In the following description reference will be made to both data stores and databases. A data store is a repository for data. Similarly, a database is structured data store. A database may be structured in any suitable way, and should not be limited by the examples provided herein. Further, while reference may be made to either a data store or database, the invention is not limited to one or the other. In other words, when a database is used to describe one embodiment of the invention, a data store may also be used. Likewise, if a data store is used to describe another embodiment, a database may also be used.

Big data environments are becoming an increasingly important aspect of all companies. The insights that can be gained by analyzing large quantities of data are invaluable. Many different methods, programs, and solutions have been developed. Apache HBase, developed by the Apache Software Foundation of Forest Hill, Md., is a non-relational distributed database capable of handling tremendous amounts of data in an efficient manner. Although reference may be made to HBase throughout this specification, the invention is applicable to many other database applications and/or implementations, and should not be limited to HBase.

Multitenancy refers to a single instance of software running on a server and servicing multiple tenants. A "tenant," in this context, typically is a legal entity that has no relationship to another tenant, and in fact plural tenants in the system may be competitors who do not share data for competitive reasons.

HBase may be used in conjunction with a multitenant service or application. For example, an HBase database may be used by many companies to store their compensation data in a shared database coupled via networks to one or more server computers that execute instances of server-based applications that implement a multitenant service or system. An example of a multitenant system is XACTLY INCENT ENTERPRISE, commercially available from Xactly Corporation, San Jose, Calif.; it is hosted by a service provider to provide shared access to custom applications that provide specialized analysis, reporting, and visualization of the compensation data. While use of the applications or application instances may be shared, data is effectively segregated by tenant to prevent transfer of confidential information of tenant to another.

In an embodiment, each company retains full access to its private data, and may also gain access to aggregated, anonymized data from all other tenants. Alternatively, the aggregated data may not be anonymized. The aggregated data may be made available in many different ways, and may be used by each individual company as a benchmark for use in a variety of ways, such as determining whether their employees are properly compensated.

3. Example System Implementation

FIG. 1 illustrates an example computer system in which the techniques described may be practiced, according to one embodiment.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates application server computer 105 that is coupled via a wired or wireless connection, or a combination thereof, to database server system 120, distributed computation system 135, and tenant device 150. Application server computer 105 comprises application service instructions 110 and pre-query optimizer instructions 115. Database server system 120 comprises database 125, and tenant data 130. distributed computation system 135 comprises processing instructions 140, columnar database 145, and tenant data 130; the distributed computation system may be implemented using a computer that is independent from the application server computer 105 although in some embodiments both computers may be implemented as different virtualized computing instances in the same datacenter.

In one embodiment, application server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the application server computer 105 broadly represents one or multiple server computers, such as a server cluster, and the server computer may be located in one or more physical locations. Application server computer 105 also may represent one or more virtual computing instances that execute using one or more computers in a datacenter such as a virtual server farm.

Application server computer 105 is communicatively connected to database server system 120, distributed computation system 135, and tenant device 150 through any kind of computer network using any combination of wired and wireless communication, including, but not limited to: a Local Area Network (LAN), a Wide Area Network (WAN), one or more internetworks such as the public Internet, or a company network. Application server computer 105 may host or execute application service instructions 110, pre-query optimizer instructions 115, and may include other applications, software, and other executable instructions, to facilitate various aspects of embodiments described herein.

In one embodiment, database server system 120 is a database system that is in production and accessible by tenants of the application server computer 105, such as tenant device 150. Database server system 120 includes database 125, which may be stored on any suitable storage device such as one or more hard disk drives, memories, or any other electronic digital data recording device configured to store data. Although database server system 120 is shown as a single element, database server system 120 may span multiple devices located in one or more physical locations and may span multiple separate databases within those devices. For example, database server system 120 may be located on one or more nodes in a data warehouse or warehouses. Additionally, in one embodiment, database server system 120 may be located on the same device or devices as application server computer 105. Alternatively, database server system 120 may be located on a separate device or devices from application server computer 105.

In one embodiment, database 125 is any type of database. Database 125 may be used to allow various tenant devices 150 to make changes to their associated tenant data 130, before the changes are checked and subsequently propagated to other special purpose databases, such as columnar database 145. Alternatively, database 125 may be used for any other purpose or in any other manner.

In one embodiment, tenant data 130 is data related to a specific tenant of application server computer 105. Although tenant data 130 is depicted as a single element, there may be a private set of data for each tenant of application server computer 105 that is accessible only by the tenant associated with that tenant data. There may be any number of tenants and any number of separate tenant data. Tenant data 130 may relate to any type of data, such as personal information, business information, governmental data, compensation data, health data, environmental data, police/military data, etc. Tenant data 130 may span any time period, such as 3 years, 15 years, the life of the business associated with the tenant, or any other amount of time.

Tenant data 130 is accessible by the associated tenant at any time for modifications, calculations, analysis, export, import, or any other action. While most of tenant data 130 is editable by the tenant, some portions thereof, such as calculated values, may not be editable by the tenant. Multiple copies of tenant data 130 may be stored in different locations, such as tenant data 130 in columnar database 145. The copies may not be exactly the same—there may be a delay in propagating any changes made to the various copies, or different versions may be maintained. When copied, tenant data 130 may be reformatted or otherwise organized into different forms for any purpose. Some copies of tenant data 130 may be read-only, such as a copy used for analytics or other calculations or processing.

In one embodiment, distributed computation system 135 is a distributed computation system that stores data, performs distributed processing or calculations on data, and is in production and accessible by tenants of the application server computer 105, such as tenant device 150. Distributed computation system 135 may include any needed components such as one or more processors, one or more memories or other digital storage devices, etc. Distributed computation system 135 is configured to perform data retrievals for analytics requests, and includes processing instructions 140 to perform processing of retrieved data for analytics. Distributed computation system 135 also includes columnar database 145, which may be stored on any suitable storage device such as one or more hard disk drives, memories, or any other electronic digital data recording device configured to store data. Although distributed computation system 135 is shown as a single element, distributed computation system 135 may span multiple devices located in one or more physical locations and may span multiple separate databases within those devices. For example, distributed computation system 135 may be located on one or more nodes in a data warehouse or warehouses. Additionally, in one embodiment, distributed computation system 135 may be located on the same device or devices as application server computer 105. Alternatively, distributed computation system 135 may be located on a separate device or devices from application server computer 105. Distributed computation system 135 may be implemented using any suitable formatting, and may include many different databases or other components.

In one embodiment, columnar database 145 is a columnar database. A columnar database is a database implemented using any suitable methodology, such as HBase. Alternatively, or in addition, columnar database 145 may be a relational database or any other type of database. Columnar database 145 may be of any size, portioned into any number of tables or other units, and may be organized in any way. Columnar database 145 stores tenant data 130, as described above. Columnar database 145 may also store additional data, such as aggregated tenant data, or any other kind of data related to or relevant to the embodiments and functionalities described herein.

In one embodiment, tenant device 150 is one or more computing devices, including, but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like.

Tenant device 150 may include applications, software, and/or other executable instructions to facilitate various aspects of the invention described herein. Specifically, tenant device 150 is able to send requests for accessing, adding to, deleting, or modifying tenant data 135, send analytics requests, receive results of analytics requests, and display the results of analytics requests, and any other functionalities needed by the present invention. In one embodiment, there may be any number of tenant devices, and each unique tenant may include one or more devices. Tenant device 150 is communicatively connected to application server computer 105 through any kind of computer network using any combination of wired and/or wireless communication, including, but not limited to: a LAN, a WAN, the Internet, a company network, etc.

Returning to application server computer 105, application server computer 105 executes application service instructions 110. Application service instructions 110 are programmed or configured to perform steps or actions associated with or needed by the invention described herein. Specifically, application service instructions 110 may include a database interface such as JDBC, ODBC, HBase client libraries, SPARQ, or any other interface or filesystem for communicating with database server system 120 or distributed computation system 135.

The database interface may communicate with any number of databases and any type of database, in any format, and may be a piece of custom software created by an entity associated with application server computer 105, or may be created by a third party entity in part or in whole. Further, application service instructions 110 are programmed or configured to send and receive data from or to tenant device 150 and other functions needed by application server computer 105.

In one embodiment, application server computer 105 executes pre-query optimizer instructions 115. Pre-query optimizer instructions 115 are programmed or configured to perform steps or actions needed for pre-execution query optimization. In one embodiment, pre-query optimizer instructions 115 are programmed or configured to perform receiving an analytics request. The analytics request may be received from tenant device 150, or any other suitable device, in any format and at any time. Specifically, the analytics request may involve retrieving tenant data, or aggregated tenant data, and performing one or more calculations on the retrieved data. Once processed, the analytics request may result in generating dynamic web pages in a SaaS-based analytics system, or causing a tenant device 150 to display a graph, chart or other visualization of the data.

In one embodiment, pre-query optimizer instructions 115 are programmed or configured to perform determining whether the application server computer, the distributed computation system, or split processing should be used for an analytics request. Pre-query optimizer instructions 115 determines where processing for the analytics request should occur based on one or more attributes of the analytics request. When the application server computer processes the analytics request, the distributed computation system returns unprocessed data needed for the analytics request, and the application server computer performs any needed processing to generate the result requested by the tenant computer. Optionally, the data returned may be aggregated. When the distributed computation system processes the analytics request, the distributed computation system retrieves data needed by the request, processes the data, and returns the result to the application server computer.

The distributed computation system may process the request using a distributed computing method, or any other method. When split processing is used, the analytics request is split into two parts—one part to be processed by the application server computer and one part to be processed by the distributed computation system.

Any attributes of the analytics request maybe used by pre-query optimizer instructions 115 to determine where processing should occur. Attributes of the analytics request may include, but are not limited to: a time or timeframe associated with the analytics request, a type of calculation or operation needed by the analytics request, a combination thereof, or any other aspect. An example of timeframe is: an analytics request that involves accessing one (1) month of tenant data may be processed by the application server computer. However, an analytics request that involves accessing four (4) months of tenant data may be processed by the distributed computation system. This form of determination is appropriate when the application server computer is relatively slower in processing analytics as compared to the distributed computation system so that only smaller queries, datasets or amounts of tenant data should be routed to the application server computer and relatively larger queries or datasets are most efficiently processed by the distributed computation system. An example of type of calculation or operation is: an analytics request that involves performing summation calculation, an average calculation, a minimum calculation, or a maximum calculation may be processed by the application server computer. However, an analytics request that involves multiple different percentile calculations may be processed by the distributed computation system.

Pre-query optimizer instructions 115 may determine the attributes that correspond to application server computer processing, distributed computation system processing, or split processing in any manner. A user, administrator, or other suitable entity may set the values for each attribute, or the values may be set using a configuration file or other stored dataset, or a programmatic call or request. Alternatively, pre-query optimizer instructions 115 may track processing times of prior requests, and identify the attributes based on the prior processing times using machine learning or any other manner. The attributes may vary from one tenant to another, based on the type and quantity of data each tenant stores, as well as the type and quantity of analytics requests received from the tenant.

In one embodiment, pre-query optimizer instructions 115 are programmed or configured to perform generating and sending queries to the distributed computation system. The queries may be generated and sent in any manner or format. In addition to indicating what data should be retrieved, the queries may include instructions for the distributed computation system, such as whether and how to process the data, or whether to simply retrieve the data needed by the request. Any number of queries may be generated from a single analytics request. For example, a single analytics request may require querying multiple different databases of the distributed computation system and may involve split processing which requires instructing the distributed computation system to performing processing on certain data or queries, while instructing the distributed computation system to not process other data or queries, as the application server computer will handle the processing.

In one embodiment, pre-query optimizer instructions 115 are programmed or configured to perform receiving interim result sets from the distributed computation system and processing the interim result set. The interim result set is unprocessed data returned from a database of the distributed computation system in response to a query. In other words, the interim result set is returned by the distributed computation system when the processing or calculations for the analytics request is performed by the application server computer. The interim result set may be processed in any manner by the application server computer to generate a result set. The result set is an answer to the analytics request.

In one embodiment, pre-query optimizer instructions 115 are programmed or configured to perform decompressing the interim result set during processing as needed. The interim result set may be received from a database of the distributed computation system in a compressed state, such as how the data was stored in the database, and may need to be decompressed to access the individual values or items during processing. The compression may be of any kind or type, such as grouping data according to database keys, and compressing individual values of the data. The decompression may be performed as needed in memory of the application server computer.

In one embodiment, pre-query optimizer instructions 115 are programmed or configured to perform displaying the result set to the tenant. The result set may be displayed in any manner and in any form. For example, the result set may be displayed using charts, graphs, tables, etc.

In one embodiment, processing instructions 140 are programmed or configured to perform retrieving data from the columnar database 145 based on a query and sending the retrieved data to the application server computer. The data may be retrieved in any manner. The retrieved data may be an interim result set, as discussed above. Depending on instructions included with the query, processing instructions 140 may send the data to the application server computer in an unprocessed form. Alternatively, processing instructions 140 may perform processing or calculations on the retrieved data to generate a result set or answer to the analytics request.

In one embodiment, processing instructions 140 are programmed or configured to perform decompressing of retrieved data during processing. As discussed above, the compression may be of any kind or type, such as grouping data according to database keys, and compressing individual values of the data. The decompression may be performed as needed in memory of the distributed computation system 135.

4. Example Functional Implementation

Figure 2:
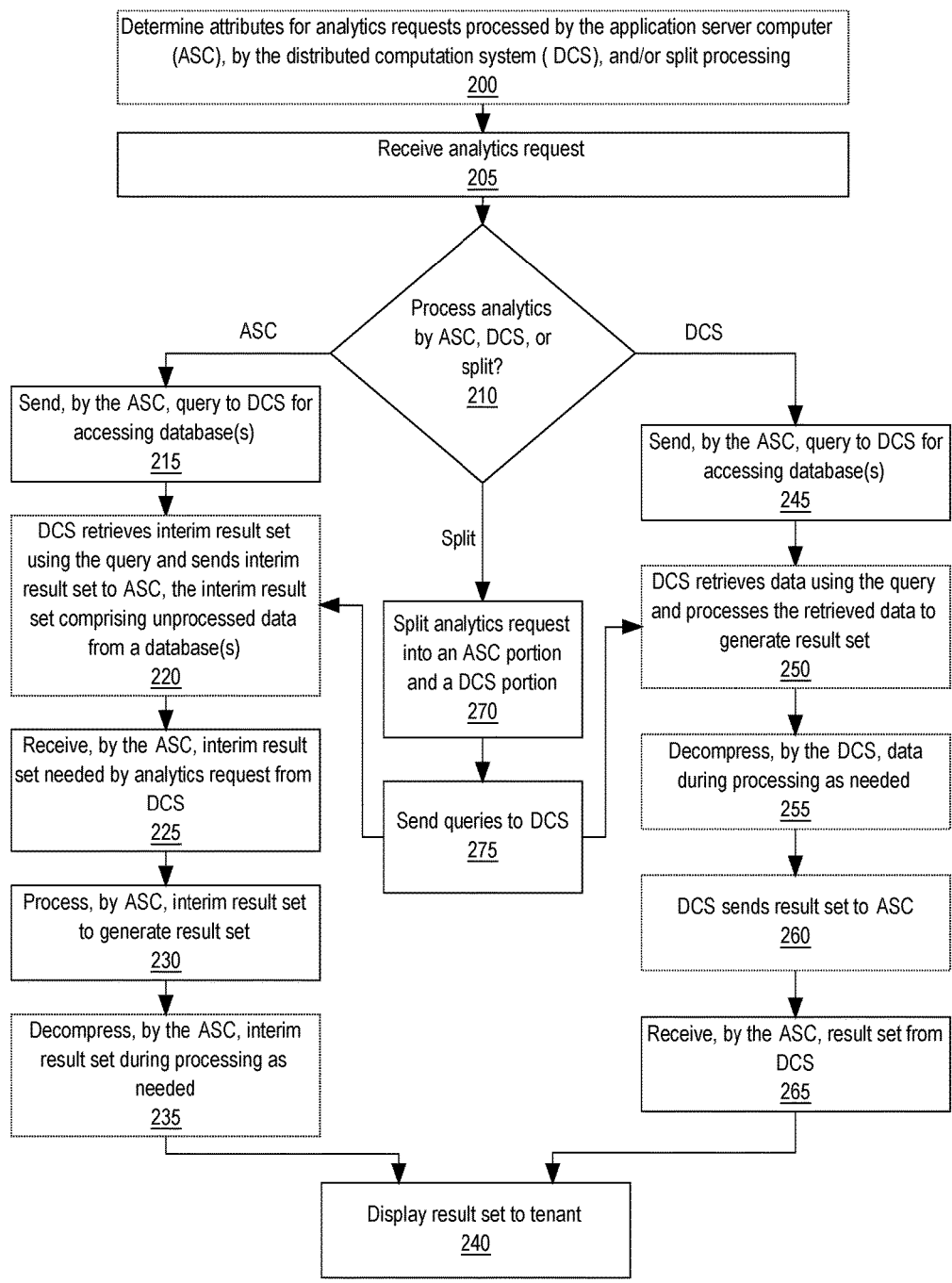
FIG. 2 illustrates a programmable algorithm or method for improving the speed of data analytics in accordance with an embodiment.

FIG. 2 illustrates an example programmable algorithm or method for improving the speed of data analytics.

Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

In step 200, attributes for analytics requests that are processed by the application server computer, by the distributed computation system, or by split processing are determined. The attributes that correspond to application server computer processing, distributed computation system processing, or split processing may be specified or set by a user, administrator, or other suitable entity, using a configuration file or other stored dataset, or a programmatic call or request.

Alternatively, the attributes that correspond to application server computer processing, distributed computation system processing, or split processing may be determined based on previous requests, based on the type, quantity, or other aspect of tenant data, based on the type, quantity, or other aspect of tenant analytics requests, or based on any other factor. As indicated by the dotted lines, step 200 may be performed at any time, such as in advance of receiving an analytics request. Alternatively, step 200 may be performed continuously, such as updating the attributes as tenant data changes, or the type or volume of analytics requests changes.

The attributes that may determine whether the application server computer processes the request, the distributed computation system processes the request, or by split processing may be any attribute of an analytics request, such as the time frame of data involved in the analytics request, or the type of calculations involved in the analytics request.

In step 205, an analytics request is received. The request may be received in any format or manner.

In step 210, a determination is made whether the application server computer will process the request, the distributed computation system will process the request, or split processing will be used. The determination is based on one or more attributes of the analytics request. If the application server computer will process the request, the method proceeds to step 215. If the distributed computation system will process the request, the method proceeds to step 245. If split processing will be used the method proceeds to step 270.

In step 215, a query is sent to the distributed computation system. The query may be generated in any manner, and in any format. The query may include additional instructions due to the application server computer processing the analytics request, as needed. Multiple queries may be sent, and the queries may cause the distributed computation system to access than one database, depending on where data resides.

In step 220, the interim result is retrieved using the query, and the interim result set is sent to the application server computer. As indicated by the dotted lines, step 220 is performed by a distributed computation system. The distributed computation system may retrieve the interim result set in any manner and from any database(s). The interim result set may be in a compressed form, such as the compressed form in which the data is stored in a database.

In step 225, the interim result set needed by the analytics request is received from the distributed computation system. The interim result set may be received by the application server computer in any format or matter. Optionally, the interim result set may be compressed, and require decompression during processing.

In step 230, the interim result set is processed to generate the result set. The interim result set may be processed in any manner. The type of processing or calculations performed may vary based on the analytics request. The processing is performed by the application server computer.

In step 235, data is decompressed during processing as needed. As indicated by the dotted lines, step 235 is optional. The data may be decompressed in any manner, based on the type of compression used.

In step 240, results are displayed to the tenant. The results may be displayed in any manner or format, on any suitable device. For example, the results may take the form of one or more charts, graphs, tables, etc. To display the result set to the tenant, the result set may be sent to the tenant in any manner or format.

In step 245, a query is sent to the distributed computation system. The query may be generated in any manner, and in any format. The query may include additional instructions due to the distributed computation system processing the analytics request, as needed. Multiple queries may be sent, and the distributed computation system may need to query more than one database to retrieve needed data, depending on where data resides.

In step 250, the distributed computation system retrieves data using the query and processes the retrieved data to generate a result set. As indicated by the dotted lines, step 250 is performed by a distributed computation system. The distributed computation system may retrieve the data from a database(s) in any manner. The retrieved data may be in a compressed form. The retrieved data may be processed in a distributed manner or any manner. The type of processing or calculations performed may vary based on the analytics request. The processing is performed by the distributed computation system.

In step 255, data is decompressed during the processing as needed. As indicated by the dotted lines, step 255 is optional and is performed by a distributed computation system. The data may be decompressed in any manner, based on the type of compression used.

In step 260, the result set is sent to the application server computer by the distributed computation system. As indicated by the dotted lines, step 260 is performed by a distributed computation system. The result set may be sent to the application server computer in any manner and any format.

In step 265, the result set is received from the distributed computation system. The result set, as received by the application server computer, is an answer to the analytics request, and no further processing is needed. Alternatively, minor additional processing or formatting may be needed.

In step 270, the analytics request is split into an application server computer portion and a distributed computation system portion. The analytics request may be split in any manner, and may be split into a number of separate portions or queries.

In step 275, queries are sent to the distributed computation system. The queries may be sent as discussed above in steps 215 and 245.

Using the above method, the speed at which analytics requests may be performed in a multi-tenant environment may be greatly improved. The improvement is large enough that some real time calculations are made possible that previously, were not possible to be performed in real time. Particularly, any analytics request which may be processed in part or in whole by the application server computer will see an improvement in processing time.

5. Example Improving Speed of Data Analytics

FIG. 3A illustrates an example of improving the speed of data analytics. FIG. 3B illustrates a second an example of improving the speed of data analytics. The examples shown in FIG. 3A and FIG. 3B has been simplified for purposes of clarity, and is intended as just one example and not to limit the disclosure to the specifics disclosed herein.

Referring first to FIG. 3A, FIG. 3A shows an example where the application server computer will process the request. At step 300, a request is received for analytics on two (2) months of tenant data. Prior to step 300, a determination was made that requests for less than four (4) months of tenant data would be processed by the application server computer, while requests for more than four months of tenant data would be processed by the distributed computation system. Thus, in step 305, a determination is made, based on the two-month timeframe of data request, that the application server computer will process the request, and a query is sent to the distributed computation system.

The query may include instructions that the distributed computation system is not to perform any processing on the requested data, as the application server computer will perform the necessary processing. In step 310, the distributed computation system retrieves the two months of data from an associated database and send the two months of data to the application server computer. In step 315, the application server computer processes the two months of data as required to generate a result to the analytics request. The processing may involving any number of different calculations. As part of the processing, the two months of data may be decompressed as needed. Finally, the result is displayed to the requesting tenant computer.

Referring first to FIG. 3B, FIG. 3B shows an example where the distributed computation system will process the request. At step 350, a request is received for analytics on ten (10) months of tenant data. Prior to step 350, a determination was made that requests for less than four (4) months of tenant data would be processed by the application server computer, while requests for more than four (4) months of tenant data would be processed by the distributed computation system. Thus, in step 355, a determination is made, based on the ten-month timeframe of data request, that the distributed computation system will process the request, and a query is sent to the distributed computation system.

The query may include instructions that the distributed computation system is to perform processing on the requested data. In step 360, the distributed computation system retrieves the ten months of data from an associated database, and processes the data. Optionally, the data is decompressed as needed during the processing. In step 365, the distributed computation system sends the results to the application server computer. Finally, the application server computer receives the result and the result is displayed to the requesting tenant.

6. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
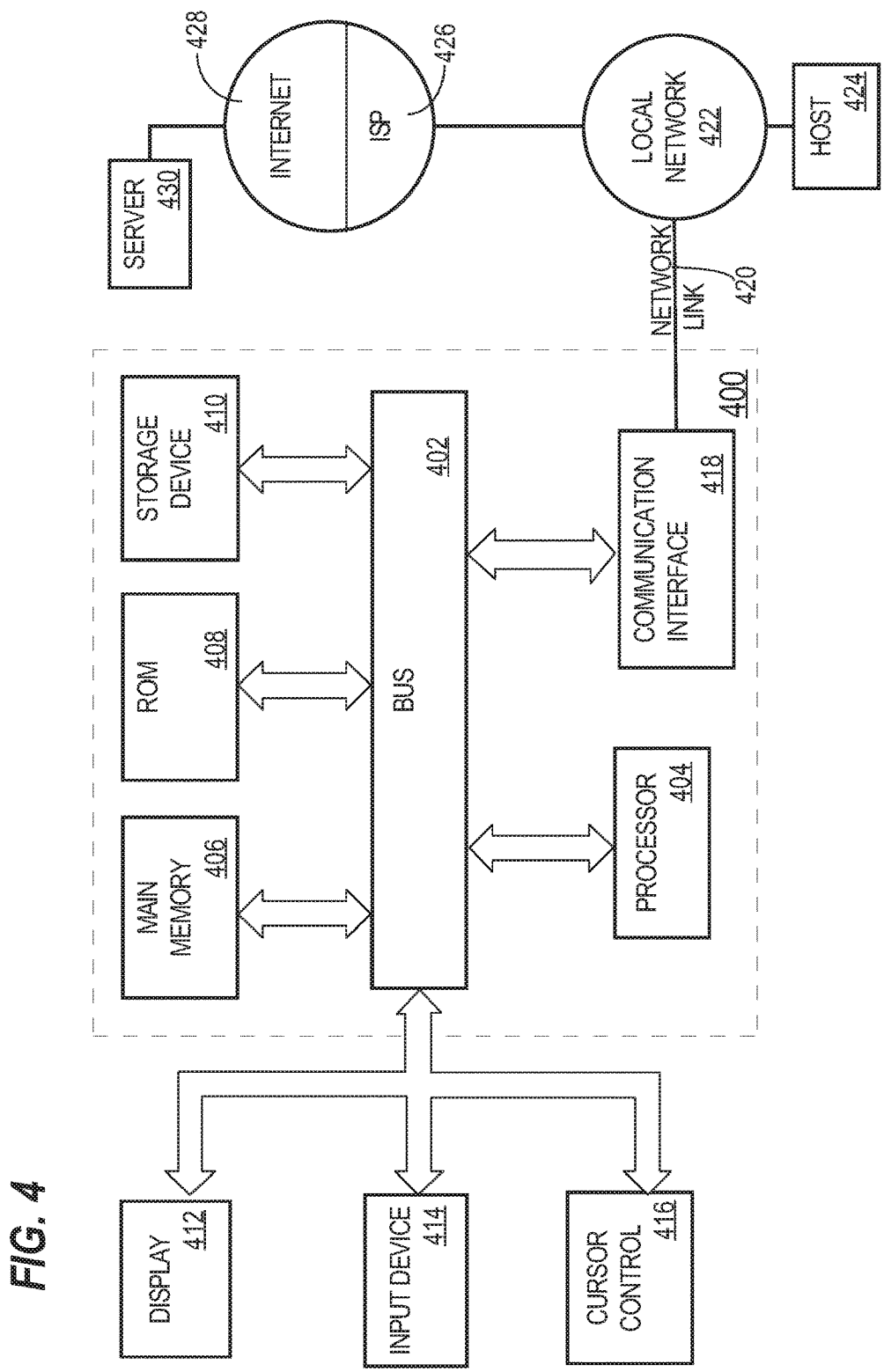
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A data processing method comprising:
   using an application server computer of an application service provider (ASP), establishing computerized shared multi-tenant data storage in which tenant data that is associated with a plurality of different tenants of the ASP is stored together in a first database associated with a distributed computation system that is separate from the application server computer;
   receiving, by the application server computer and from a tenant computer that is associated with a tenant of the plurality of different tenants, an analytics request;

determining, based on at least one attribute of the analytics request and by the application server computer, whether the application server computer will process at least a portion of the analytics request to generate a first result set for the analytics request or whether the distributed computation system will process at least a portion of the analytics request to generate the first result set for the analytics request;

in response to determining the application server computer will process at least the portion:

sending, by the application server computer and to the distributed computation system, a first query for data needed by the analytics request;

receiving, by the application server computer and from the distributed computation system, an interim result set of data resulting from processing the first query against the first database, wherein the interim result set comprises unprocessed data from the first database;

processing, by the application server computer, the interim result set of data for the analytics request to generate and digitally store the first result set.

2. The method of claim 1, wherein the at least one attribute is a timeframe, a type of calculation, or both.

3. The method of claim 1, wherein the at least one attribute is a timeframe of three months.

4. The method of claim 1, further comprising:

determining, based on at least one attribute of the analytics request, the distributed computation system will process the analytics request;

in response to determining the distributed computation system will process the analytics request:

sending, to the distributed computation system, a second query for data needed by the analytics request, wherein the distributed computation system processes the data for the analytics request to generate a second result set;

receiving, from the distributed computation system, the second result set.

5. The method of claim 1, further comprising:

determining, based on at least one attribute of the analytics request, the distributed computation system will process a first portion of the analytics request and the application server computer will process a second portion of the analytics request;

in response to determining:

sending, to the distributed computation system, a third query for data needed by the analytics request, wherein the distributed computation system processes data for the first portion of the analytics request to generate a third result set;

receiving, from the distributed computation system, the third result set and a second interim result set of data resulting from processing the third query against the first database;

processing, by the application server computer, the second interim result set of data for the analytics request to generate and digitally store a fourth result set.

6. The method of claim 1, wherein determining the application server computer will process at least the portion is based on the analytics request specifying a summation calculation, an average calculation, a minimum calculation, or a maximum calculation.

7. The method of claim 1, further comprising:

receiving the interim result set of data needed by the analytics request at the application server computer in a compressed format;

decompressing, during the processing, the interim result set of data needed by the analytics request.

8. The method of claim 1, wherein the first database is a columnar database, and wherein the tenant data is compensation data.

9. A system comprising:

one or more application server computers communicatively connected to a distributed computation system, the one or more application server computers comprising one or more processors and electronic digital memory storing one or more sequences of instructions which, when executed by the one or more processors, cause the one or more processors to perform:

establishing computerized shared multi-tenant data storage in which tenant data that is associated with a plurality of different tenants of the ASP is stored together in a first database associated with the distributed computation system that is separate from the application server computer;

receiving, from a tenant computer that is associated with a tenant of the plurality of different tenants, an analytics request;

determining, based on at least one attribute of the analytics request, whether the one or more application server computers will process at least a portion of the analytics request to generate a first result set for the analytics request or whether the distributed computation system will process at least a portion of the analytics request to generate the first result set for the analytics request;

in response to determining the application server computer will process at least the portion:

sending, to the distributed computation system, a first query for data needed by the analytics request;

receiving, from the distributed computation system, an interim result set of data resulting from processing the first query against the first database, wherein the interim result set comprises unprocessed data from the first database;

processing, the interim result set of data for the analytics request to generate and digitally store the first result set.

10. The system of claim 9, wherein the at least one attribute is a timeframe, a type of calculation, or both.

11. The system of claim 9, wherein the at least one attribute is a timeframe of three months.

12. The system of claim 9, further comprising:

determining, based on at least one attribute of the analytics request, the distributed computation system will process the analytics request;

in response to determining the distributed computation system will process the analytics request:

sending, to the distributed computation system, a second query for data needed by the analytics request, wherein the distributed computation system processes the data for the analytics request to generate a second result set;

receiving, from the distributed computation system, the second result set.

13. The system of claim 9, further comprising:

determining, based on at least one attribute of the analytics request, the distributed computation system will process a first portion of the analytics request and the application server computer will process a second portion of the analytics request;

in response to determining:

sending, to the distributed computation system, a third query for data needed by the analytics request, wherein the distributed computation system processes data for the first portion of the analytics request to generate a third result set;

receiving, from the distributed computation system, the third result set and a second interim result set of data resulting from processing the third query against the first database;

processing, by the application server computer, the second interim result set of data for the analytics request to generate and digitally store a fourth result set.

14. The system of claim 9, wherein determining the application server computer will process at least the portion is based on the analytics request specifying a summation calculation, an average calculation, a minimum calculation, or a maximum calculation.

15. The system of claim 9, further comprising:

receiving the interim result set of data needed by the analytics request at the application server computer in a compressed format;

decompressing, during the processing, the interim result set of data needed by the analytics request.

16. The system of claim 9, wherein the first database is a columnar database, and wherein the tenant data is compensation data.

* * * * *